United States Patent [19]

Cornwell

[11] Patent Number: 5,238,897
[45] Date of Patent: Aug. 24, 1993

[54] CATALYST FOR MOLECULAR CATALYTIC CRACKING OF HEAVY HYDROCARBONS AT AMBIENT TEMPERATURES, AND METHOD OF MAKING THE SAME

[75] Inventor: James H. Cornwell, Raleigh, N.C.

[73] Assignee: North Carolina Center for Scientific Research, Inc., Goldsboro, N.C.

[21] Appl. No.: 766,722

[22] Filed: Sep. 27, 1991

[51] Int. Cl.$^5$ .................. B01J 23/34; B01J 23/72; B01J 37/34

[52] U.S. Cl. .................. 502/324; 502/522

[58] Field of Search .................. 502/324, 522

[56] References Cited

U.S. PATENT DOCUMENTS

| | | | |
|---|---|---|---|
| 3,264,226 | 8/1966 | Johnson | 502/324 X |
| 3,773,894 | 11/1973 | Bernstein et al. | 502/324 X |
| 3,957,692 | 5/1976 | Cairns et al. | 502/314 |
| 4,832,926 | 5/1989 | Schillaci | 502/324 X |

*Primary Examiner*—W. J. Shine
*Attorney, Agent, or Firm*—White & Case

[57] ABSTRACT

A surface modified catalyst of the type comprising at least two mechanically mixed elements forming active catalyst sites at the boundaries of such elements. The surface-modified catalyst is formed by irradiating a catalyst compound, which is preferably hopcalite (copper-manganese), at an energy level sufficient to cause molecular dispersion of the copper molecules and increase the number of active sites. One or more additional elements may be added to the surface-modified catalyst, e.g. lithium and yttrium, to affect the reaction properties and temperature stability.

7 Claims, 6 Drawing Sheets

CATALYST FOR MOLECULAR CATALYTIC CRACKING OF HEAVY HYDROCARBONS AT AMBIENT TEMPERATURES, AND METHOD OF MAKING THE SAME

FIELD OF INVENTION

The present invention relates to catalysts of the type which are composed of at least two mechanically mixed elements forming active catalyst sites at the boundaries of such elements.

BACKGROUND OF THE INVENTION

A number of factors have contributed to the growing problem of air contamination in commercial, industrial, and residential buildings. For energy conservation, new buildings are being built to be very tight, that is, to minimize infiltration of outside air into the building, and minimize the release of air from the building to the outside except as controlled by the building heating, ventilating, and air conditioning (HVAC) system. Additionally, for energy conservation reasons, building owners often operate the HVAC systems in a manner that will minimize the induction of fresh air in very hot and very cold weather. Meanwhile, buildings house an increasing amount of equipment, furniture, and building materials, as well as chemicals used to clean and maintain the building and its contents, which contaminate the air within the building. Insufficient replacement of stale air with fresh air, combined with the release of contaminants into the building air, results in what is sometimes called the "tight building syndrome". The air in buildings with "tight building syndrome" has been found to contain, among other substances, hydrocarbons, both methane and nonmethane, formaldehydes, aldehydes, acrolein, nitrous oxide, carbon monoxide, hydrogen sulfide, ammonia, and hydrogen cyanide. The air frequently contains, as well, a high level of particulates, e.g., mold spores, pollen, and dust, which serve as vehicles to carry microbiological contaminants, as the particulate filters commonly used in the HVAC systems are not very effective, and are often not properly maintained.

NIOSH (National Institute for Occupational Health and Safety) and investigations have been undertaken relative to indoor air quality. Investigations have been conducted in private and government sector office buildings, as well as in schools, colleges, and health care facilities. The symptoms and health complaints reported by the workers and occupants of the buildings have been diverse, and not specific to any particular medical diagnosis or readily associated with a causative agent. A typical spectrum of symptoms has included headaches, varying degrees of itching and burning eyes, irritation of the skin, including rashes, sinus problems, dry and irritated throats, and other respiratory irritations. The work place environment has been implicated, by virtue of the fact that symptoms normally disappear on weekends, when people are away from the office. At times these symptoms have been severe enough to result in missed work, lost time, reassignment, and even termination. This has caused increased anxiety among workers, and often times has made the investigation in these areas difficult and frustrating.

Although some of these episodes may be multi-factorial, most of the studies have been classified by the primary types of problems found. In recently reported investigations, inadequate ventilation was determined to be the cause in 52% of the investigative cases. Contamination inside the building resulted in 17%. Contamination from outside the buildings was indicated by 11%. Microbiological contamination was attributed to approximately 5% of the problems in these studies. 3% of the cases were attributed to fabrics, wall treatments, formaldehyde emissions from wall treatments, hangings, carpets, materials, fiber materials, polyester, fabrics, etc. Roughly 12% of the problems of the investigation were undetermined.

Inadequate Ventilation

In 52% of NIOSH investigations, the building ventilation was determined to be inadequate. In evaluating building ventilation, ASHRAE (American Society of Heating, Refrigeration and Air Conditioning Engineers) standards are normally used for comparison. ASHRAE standard 62-1981 entitled "Ventilation for Acceptable Indoor Air Quality", and ASHRAE standard 55-1981 entitled "Thermal Environmental Conditions for Human Occupancy" are both used for evaluation purposes. Some of the ventilation problems commonly encountered include an insufficient supply of fresh outdoor air, poor air distribution or mixing, which causes stratification, drafts, and pressure differentials between office space; temperature and humidity extremes or fluctuations, which sometimes are caused by poor air distribution or faulty thermostats; and air filtration problems caused by a faulty or no-maintenance ventilation systems. In many cases, the ventilation problems are created or compounded by certain energy conservation measures applied in the operation of the ventilation system. These including reducing or eliminating fresh outdoor air, reducing infiltration and exfiltration, lowering thermostat settings in winter, raising them in summer, elimination of humidification systems; and early afternoon shutdown with late morning start-up of emission systems.

Inside Contamination

Contamination generated by sources inside the office space is a major problem identified in 17% of the investigations. Copier machines, computers, and other office equipment are often found to be a significant source of indoor contamination, ranging from ozone to polymers, acrolein, hydrogen cyanides, and materials from the inks and dyes used in the printing process. Examples of this type of problem include methyl alcohol from spirit duplicators, butyl methacrylate from signature machines, and ammonia and acetate from blueprint copiers. Other inside contamination encountered includes exposure to pesticides, such as chlordane, which were improperly applied, dermatitis from boiler additives, such as diethyl ethanolamine, etc., improperly diluted cleanly agents, such as rug shampoos, tobacco smoke, and other gasses common to cafeterias and laboratories, and other sources which leak into other air handler zones.

Contaminants from inside or outside the office space, or the building fabric, are essentially chemical contaminants. Many times odors are associated with some of these contaminants, which aid in source identification. In most cases, these chemical contaminants have been measured at levels above ambient (or normal) background but far below any existing occupational criteria. Even though these levels are below the evaluation criteria, they are still at sufficient levels to create at times discomfort and disfunction for the employees and workers in these environments.

Outside Contamination

Contamination from sources outside the office space is the major problem identified in 11% of the NIOSH investigations. Problems due to motor vehicle exhaust, boiler gases, and previously exhausted air are essentially caused by the re-entrainment of outside air. This is usually the result of improperly locating exhaust and intake vents and periodic changes in wind conditions. Other outside contaminants include contaminants from construction or renovation projects such as asphalt, solvents, and dusts; also gasoline fumes invading the basement and/or sewage systems can sometimes be a problem, and these are usually caused by gasoline leaks from ruptured, underground tanks at nearby service stations. One of the most common sources of outside contamination has been vehicle exhaust fumes from parking garages being drawn into building systems. Outside contaminations which are introduced into indoor environments are the result of proximity to intake vents.

Microbiological Contamination

5% of NIOSH investigations have involved some type of microbiological contamination. Even though this is not a common cause of office problems, it can result in a potentially severe health hazard known as hypersensitivity pneumatosis. This respiratory problem can be caused by bacteria, fungi, protozoa, and microbial products that may originate from ventilation system components. A similar condition, known as humidifier fever, most commonly reported in Europe, is also the result of microbiological contamination in systems. In the investigations, microbiological contamination has commonly resulted from water damage to carpets or furnishings, or standing water in ventilation systems and cooling coil areas.

Although a variety of disorders, hypersensitivity, pneumatosis, humidifier fever, allergic rhinitis, conjevitis, can result from microbiological exposure, the NIOSH studies did not generally document these disorders on the basis of medical or epidemiological data. However, even if visible, microbial growth cannot be directly related to health complaints reported, it is a problem that needs to be addressed and corrected.

Building Fabric Contamination

Contamination from building material products is the major problem in 3% of the investigations. Formaldehyde can offgas from ureaformaldehyde, foam insulation, particle board, and some glues and adhesives commonly used in construction. Building fabric problems encountered include dermatitis resulting from fibrous glass erosion in lined ventilating ducts, various organic solvents from glues and adhesives, and acetic acid, used as a curing agent in silicone caulking.

Conclusion

The major problems identified in indoor air quality investigations can be placed into three general categories, listed by decreasing frequency:
1. inadequate ventilation
2. chemical contamination
3. microbiological contamination.

Inadequate Ventilation is the single largest problem seen in tight building syndromes. Although varied, these ventilation problems can allow a build-up of any contaminants in the occupied space to the point that adverse health effects are experienced, or allow the environment to become annoyingly uncomfortable to the office workers.

While not previously mentioned, tobacco smoke is also a major contributor to indoor air quality problems. Tobacco smoke contains several hundred toxic substances, the more important of which are carbon monoxide, nitrogen dioxide, hydrogen cyanide, hydrocarbons, ammonia, benzene, hydrogen sulfide, benso-A-pyrene, tars, and nicotine. Tobacco smoke can irritate the respiratory system and, in allergic and asthmatic persons, often results in wheezing, coughing, eye and nasal irritation, sneezing, and other related sinus problems. People who wear contact lenses often complain of burning, itching, and tearing eyes from cigarette smoke. The ASHRAE ventilation guidelines for smoking areas recognized the need to provide additional ventilation (fresh outside air) to maintain air quality.

Extensive research and study from various industrial and regulatory groups has transpired relative to improvement of indoor air quality. Recommended actions pertain to cleaning, maintenance, and control procedures, i.e., increased building ventilation and re-aeration or oxygenation. It is clear that these measures address only some of the causes of poor air, and would produce only moderate improvements in the quality of the air. To achieve even these modest improvements would be very labor intensive, subject to production scheduling, and add to both overhead and operating costs.

There are presently known various types of filters that may be used in HVAC recirculation systems to remove particulate matter from polluted air streams. It would be desirable to remove harmful gaseous pollutants as well in indoor air treatment and other applications. It would also be desirable to provide a system for removal of such gaseous pollutants that operates at or near room temperature. Further, it would be desirable to provide a filters which could be used in a room or building air recirculation system to remove both harmful gaseous pollutants and particulates.

There are various types of known oxidation catalysts for treatment of organic compounds. Catalytic converters used in automobiles, for example, employ catalysts of noble metals for conversion of hydrocarbons, carbon monoxide, and nitrous oxide. Such catalysts are relatively high in cost, and moreover have a relatively high light off temperature, and thus require that the passing gas stream be maintained at a relatively high temperature. Aside from the cost of the catalyst materials, the elevated temperatures required make such catalysts unsuitable for most air treatment applications (e.g., in air conditioning systems) and unsuitable for use on typical filter materials.

There are several catalysts that are effective on certain types of harmful gases at room temperature. These include hopcalite, which is a copper/manganese compound used in gas masks for converting carbon monoxide into carbon dioxide ($CO_2$).

While hopcalite would counteract certain harmful gases, it is not generally suitable for certain applications, such as HVAC systems. Conventional hopcalite is moisture sensitive, and the moisture (humidity) normally present in indoor air would eventually deactivate the catalytic properties of the material.

Also, hopcalite is sold in granular pellets for use in a packed bed form which, if use in HVAC systems, would introduce a pressure drop across the air recirculation duct. It would be preferable to use hopcalite as a filter or ceramic coating. Aside from the moisture problem, however, conventional hopcalite is not generally suitable for such applications, in that, for example, if mixed in a slurry for a wash coat application, its catalytic properties would be deactivated.

SUMMARY OF THE INVENTION

The present invention is an improved catalyst of the type comprising at least two mechanically mixed elements forming active catalyst sites at the boundaries of such elements. The catalyst material has been surface modified, in accordance with the process of the present invention, by irradiation at an energy level sufficient to cause molecular dispersion of at least one of the elements. According to the present invention, the number of active sites are substantially increased, thereby significantly improving the catalytic effectiveness. The preferred catalyst compound comprises hopcalite.

In accordance with a preferred process, hopcalite is irradiated in an electromagnetic field of sufficient strength so as to induce a plasma diffusion and sputtering of the copper particles throughout the manganese mass. Microscopic examination of such surface modified hopcalite shows a dispersion of copper particles and an increase in the number of the copper-manganese interfaces that form the active catalytic sites.

Surface modified catalysts according to the invention may be utilized as effective room temperature catalysts. Such catalysts, unlike conventional catalysts such as hopcalite, can be applied to various types of carriers, such as ceramics, metal, and fibers, as a wash coat without losing their effectiveness. Such catalysts can also be employed in higher temperature applications.

It is preferable to combine one or more additives with the hopcalite material in order to modify its catalytic properties. Such materials include lithium, which improves the resistance of hopcalite to moisture and helps stabilize the hopcalite at higher temperatures. Lithium is preferably added prior to irradiation. It has been found that lithium reacts exothermally with carbon dioxide and water, and thus can raise the reaction temperature of the hopcalite to increase the reaction rate and keep the catalyst dry. Yttrium may be added, preferably after irradiation, as a stabilizer to control the forward reaction rate of the lithium. It has also been found to affect the pore diffusion of the gases in the catalyst and can cause the gases to stick to the catalyst walls and thereby increase the reaction time.

For a better understanding of the invention, reference is made to the following detailed description of the preferred embodiments, taken in conjunction with the drawings accompanying the application.

DETAILED DESCRIPTION OF THE PREFERRED EMBODIMENTS

Figure 1:
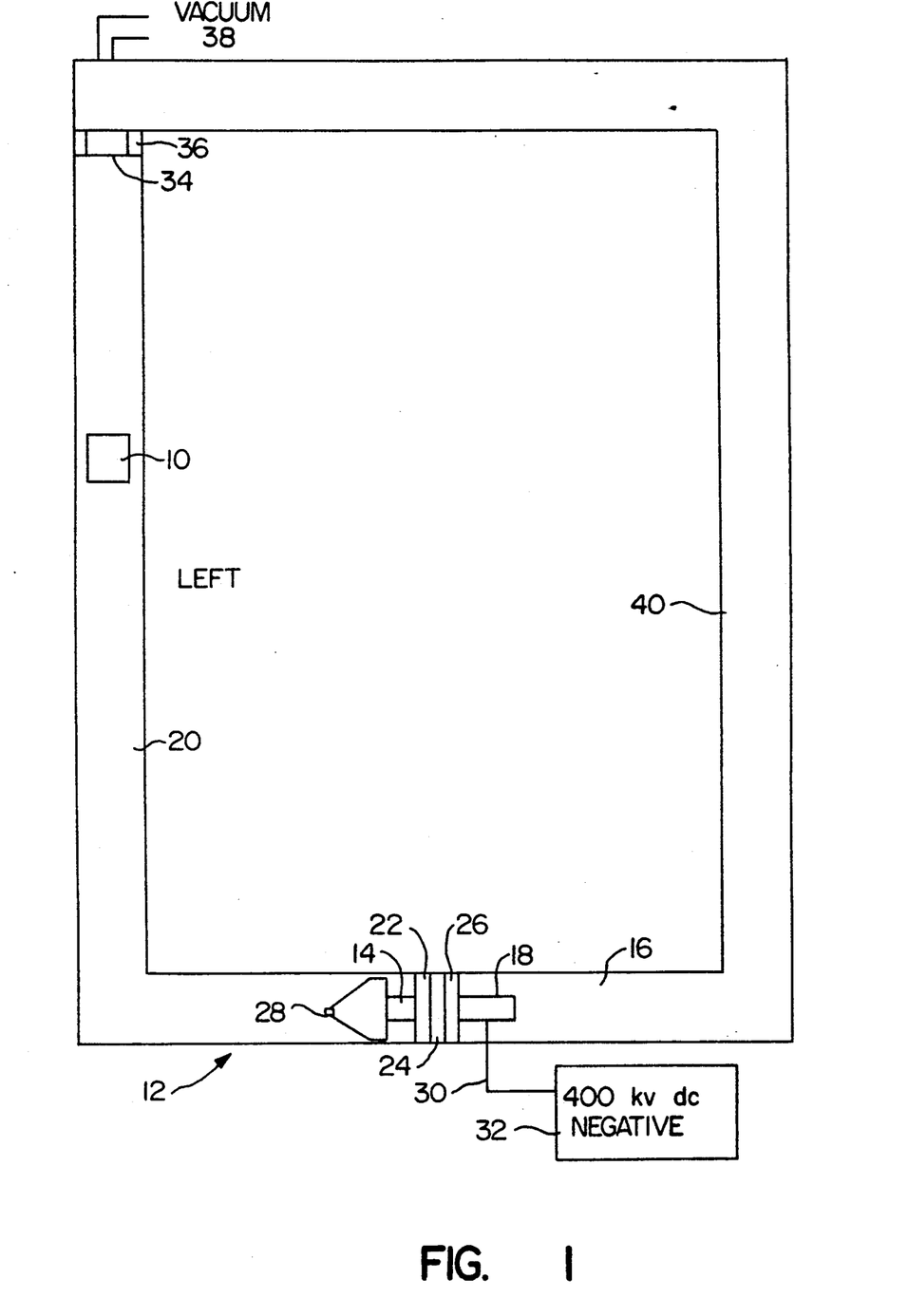
FIG. 1 is a top, schematic view of an apparatus for irradiating catalyst materials according to the invention.

In accordance with a preferred process according to the present invention, hopcalite, which is a mixture of oxides of copper and manganese, is placed in an irradiation chamber, such as shown in FIG. 1.

A suitable hopcalite starting material is sold by the Callery Chemical Companies, Callery, Pa.. The hopcalite, which is sold in granular pellet form, is preferably ground to a fine powder of about 20-50 micron size prior to irradiation. Also, as described further below, one or more additional components, e.g., lithium (in the form of lithium nitrate or lithium hydroxide), may be added to the hopcalite prior to irradiation.

In a preferred process, lithium nitrate is added in an amount of 15% by weight to hopcalite. The hopcalite/lithium product 10 is then loaded into an evacuator tube 12, as shown in FIG. 1. An exemplary apparatus 12 is formed of four tubular sections, e.g., of 6 inch diameter tubing, arranged in a rectangular configuration when viewed from the top, as in FIG. 1. Although not shown specifically in the schematic drawing, the adjoining tube sections are provided with sealed compression joints so that it can be disassembled.

An electrode 14 is placed in the center of one of the tubular frame sections 16. As shown, the electrode is a bullet nosed probe, in which the bullet nose has a diameter of about 5⅛ inches, and the shaft portion 18 has a diameter of about 2 inches. Preferably, the probe 14 is made of aluminum. The probe is centered on the axis of the tube section 16 and, in the orientation shown, faces the left tube section 20. The probe 14 is supported in the tube section 16 by three dielectric adapter rings 22,24,26 made, respectively, of delron, phenalic, and nylon. The rings 22,24,26 contain a central hole for the probe shaft 18, and are sized to make frictional contact with the inside wall of the tube section 16.

A ¼ inch diameter nickel shank 28 fits into the probe, and a high tension wire 30, connected to the probe shank, passes through the tube wall and is connected to a 400 kvdc, 1 milliamp, negative power source 32. Preferably, the probe is given a highly polished surface, e.g., a #8 microfinish.

At the far end of the left tube section 20, i.e. at the end opposite that adjoining tube section 16, a positive ground target, in the form of a circular disk 34, is supported in a dielectric spacer ring 36 which, in turn, is frictionally fit within the tube section 20. The target 34 is preferably about 5¾ inches in diameter and 1/16 inch in thickness and made of steel coated with platinum. Target 34 is not grounded, but rather acts as a floating ground. Also, each of the dielectric rings 22,24,26,36 is perforated to allow air to pass axially through the rings and circulate freely around the rectangular tubing course 12.

To operate the process, the sample 10 is loaded in the left tube section of the apparatus, between the probe 14 and the target 34. A vacuum of negative 1 atmosphere is applied to the tube, through vacuum port 38, and the probe is activated. When operated at 400 kv, typically a hopcalite sample will be irradiated for about 90 seconds. In the event a lower voltage is used, the exposure time should be increased commensurately.

The probe 14 establishes an ion field within the apparatus, and nickel shank 28 produces an electron driving or tunneling effect. A reflected wave drives in the negative direction, i.e., in the direction of electron flow, from probe 14 towards the target, whereas the wave off the back of the probe (toward the right hand tube section 40) is a refracted, rather than a reflected, wave. The result is a low temperature, chemically reactive plasma.

Figure 2:
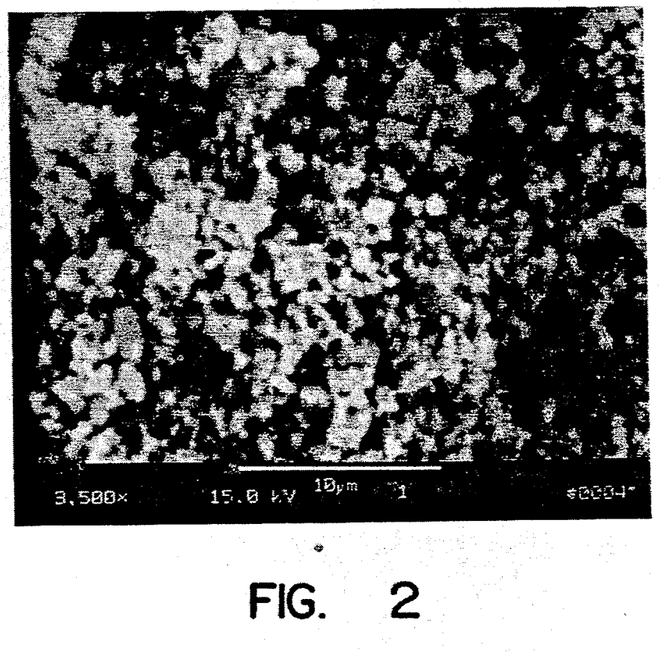
FIG. 2 is a an electron microscope photograph of the surface of conventional hopcalite.
Figure 3:
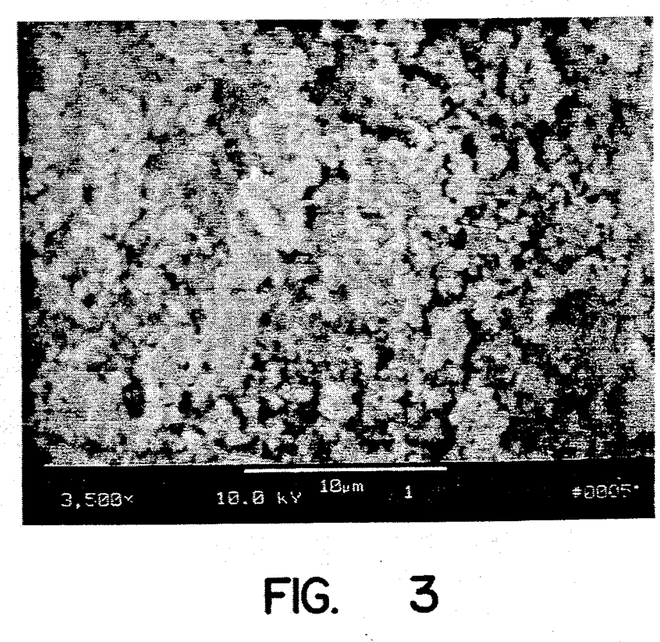
FIG. 3 is an electron microscope photograph of hopcalite after undergoing surface modification according to the process of the present invention.

Hopcalite which is subjected to the irradiation process undergoes a sputtering, as shown by FIGS. 2 and 3. Moreover, the atomic structure is altered.

Hopcalite which has been surface modified in such a manner (which is referred to throughout this specification as "surface modified hopcalite") has a marked increase in active catalytic sites, which can be seen by comparing FIG. 2 (unmodified hopcalite) with the same material after modification according to the invention, which is shown in FIG. 3. FIGS. 2 and 3 are 3500× magnifications, using an electron scanning microscope, of the surfaces of the respective materials. The standard copper/manganese catalyst shows heavy agglomerations of copper (which appears in white) on the manganese (dark areas). In contrast, in the surface modified catalyst according to the invention the catalytic sites are smaller and more evenly dispersed over the manganese, thus producing a much greater number of active sites per unit of area.

From EDAX data and other analysis, it has been discovered that the plasma reaction effects a surface reconstruction of the $MnO_2CuO$ hopcalite. A typical sample of unprocessed hopcalite has a surface composed of 80.21% by weight of the manganese component and 13.89% by weight of the copper component. In contrast, an analysis of a sample taken from the same batch of hopcalite material, after being subjected to the plasma process, showed a surface which is 70.69% by weight manganese and 22.97% by weight copper. Moreover, the material undergoes a substantial rearrangement of its atomic structure as a result of the plasma treatment. Material that started out as $MnO_2 \cdot CuO$, which is exposed to the plasma process according to the present invention, is converted, due to changes in electron valence, to $MnO_{1.6}CuO$.

A surface modified catalyst possesses characteristically improved catalytic properties, in that the number of active sites is drastically increased. This provides a substantial improvement in the ability of the material to remain effective when subjected to moisture. Due to the increase in active sites, unlike conventional hopcalite it may be utilized in processes such as wash coating without losing its catalytic properties.

To further increase the moisture resistance of the modified hopcalite, lithium nitrate and/or lithium hydroxide is added to the hopcalite. By way of example, lithium may be added to the hopcalite in an amount of approximately 15% prior to irradiation. When air flow, and particularly moist or damp air, is directed over the catalytic surface, the moisture and carbon dioxide react exothermally with the lithium, producing localized heat. This surface heat acts to keep the catalyst dried out and impervious to the moisture contained in the air stream. Because the heat is localized, it is desirable to ensure a homogeneous distribution of the lithium throughout the catalyst. Preferably also, yttrium is added to the catalyst (i.e., after irradiation of the hopcalite/lithium), e.g., in an amount of approximately 3% by weight (relative to the weight of the hopcalite), in order to control the rate of the forward reaction of the exotherm. Lanthanum may also be added in a fractional amount.

When hopcalite is subjected to elevated temperatures, its catalytic effectiveness tends to decrease. While the surface modified catalyst without lithium can undergo temperature aging, e.g., at 600° C. and still remain effective, it does undergo some loss in catalytic properties. Thus, for use in higher temperature applications, or where the catalyst will be used with binders having elevated curing temperatures, lithium is preferably added to the hopcalite material as a temperature stabilizer in order to retain more of its catalytic properties upon temperature aging.

A surface-modified catalyst according to the invention may be used in various applications. As modified, the material exhibits a significant improvement in catalytic conversion efficiency in oxidizing carbon monoxide.

Figure 4:
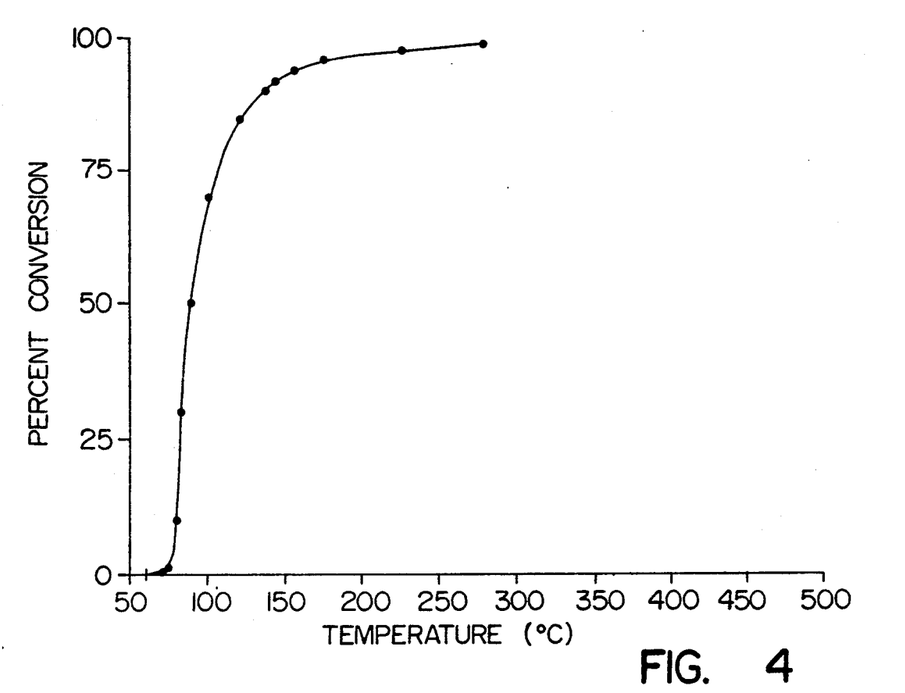
FIGS. 4-6 are graphs showing conversion rate versus temperature of surface-modified hopcalite, containing yttrium and lanthanum, on propane, carbon monoxide, and acetone, respectively.
Figure 5:
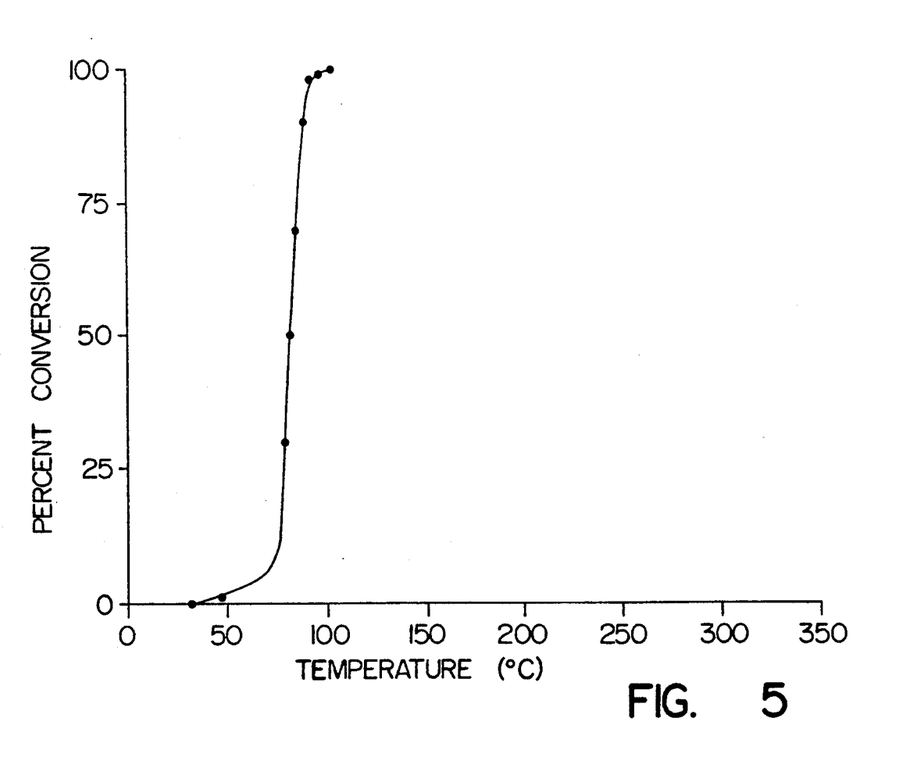
Figure 6:
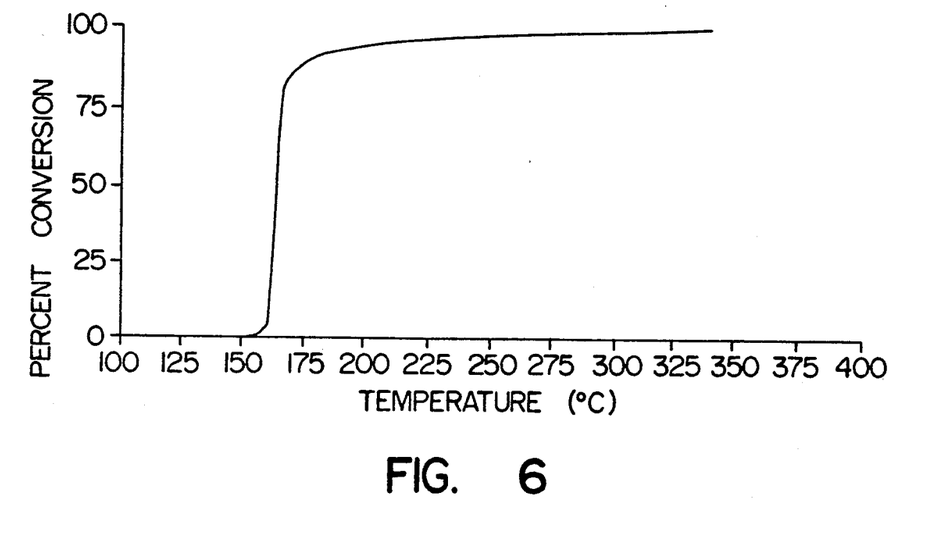

FIGS. 4, 5 and 6 show the conversion rate versus temperature of surface modified hopcalite on propane, carbon monoxide, and acetone, respectively. Conventional hopcalite was surface modified in accordance with the plasma reaction process of the invention, and yttrium and lanthanum were then added. In the case of propane and carbon monoxide, the hopcalite was applied as a wash coat on 200 cpi cordierite. In the case of the acetone test, the hopcalite was applied as a wash coat to a 200 cpi honeycomb core. The hopcalite was not subjected to temperature aging. Air containing 389 ppm propane (FIG. 4), 2% carbon monoxide (FIG. 5) and 2000 ppm acetone (FIG. 6) was directed through the ceramic carrier at a rate of 40,000 CF/hour. As shown, the hopcalite has a relatively low light off temperature in each case.

Figure 7:
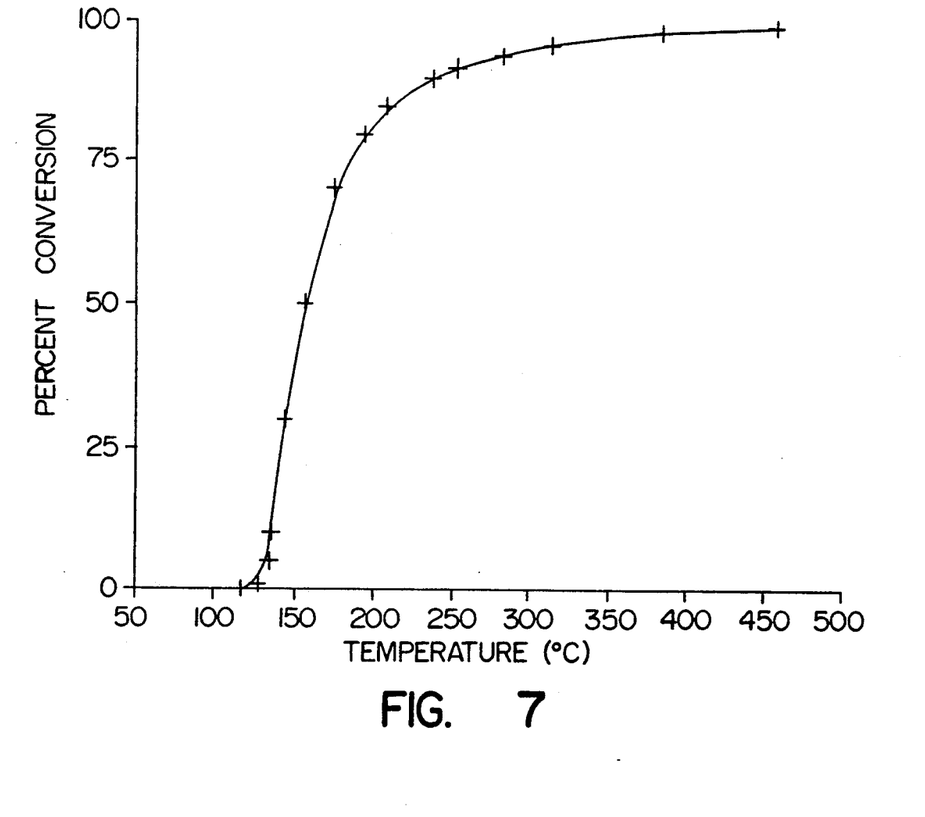
FIGS. 7-9 are graphs showing conversion rate versus temperature of surface-modified hopcalite containing yttrium, lanthanum, and lithium, which has been heat aged, on propane, carbon monoxide, and acetone, respectively.
Figure 8:
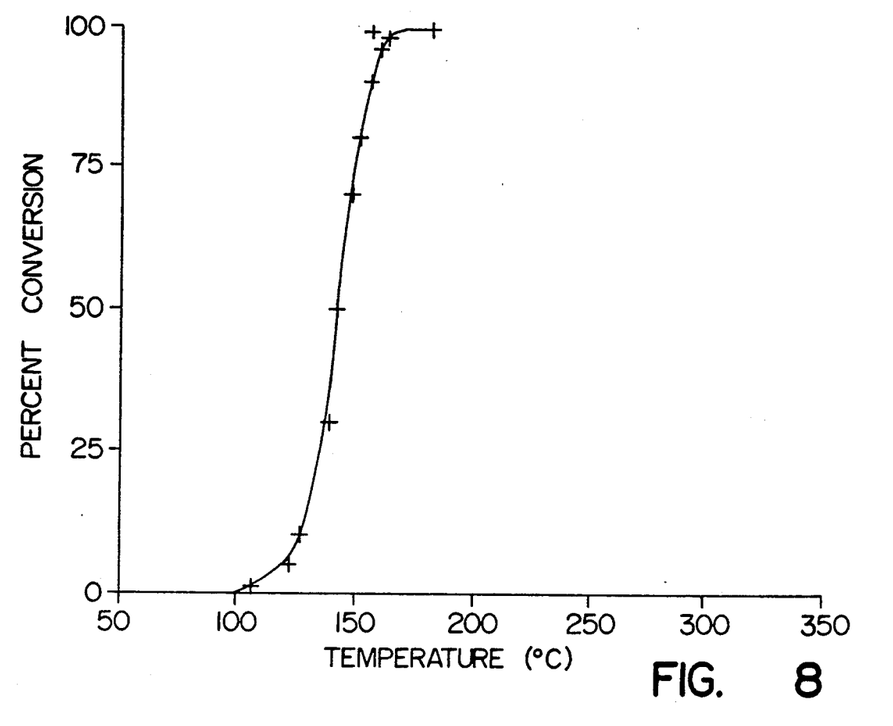
Figure 9:
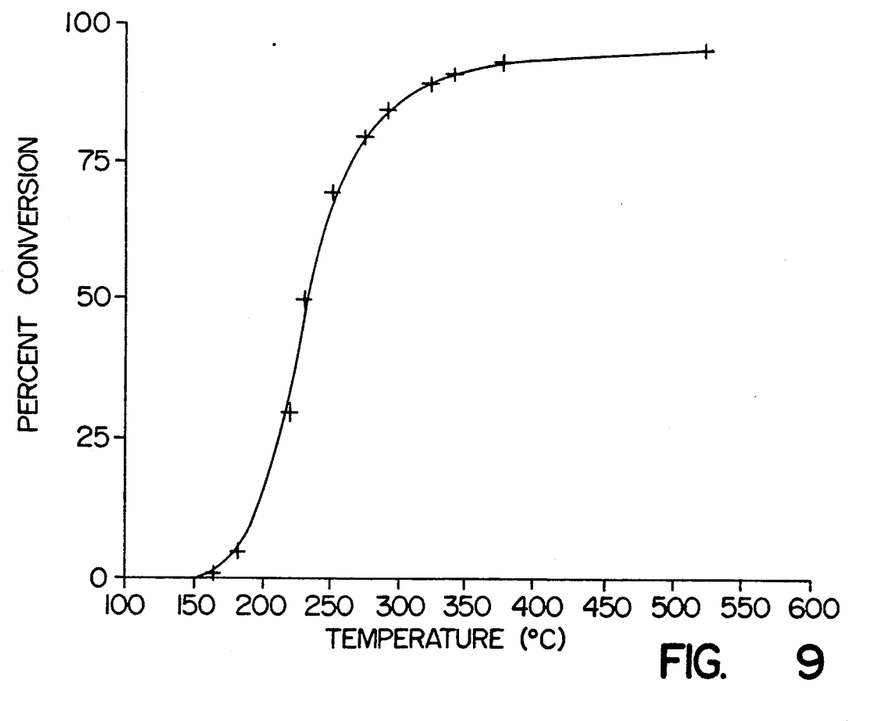

FIGS. 7, 8 and 9 correspond respectively to FIGS. 4, 5 and 6, except that the hopcalite has been subjected to temperature aging at 600° for 18 hours. In this case, lithium has been added to the hopcalite prior to irradiation. As shown, the hopcalite has substantially retained its favorable catalytic properties despite the aging.

Figure 10:
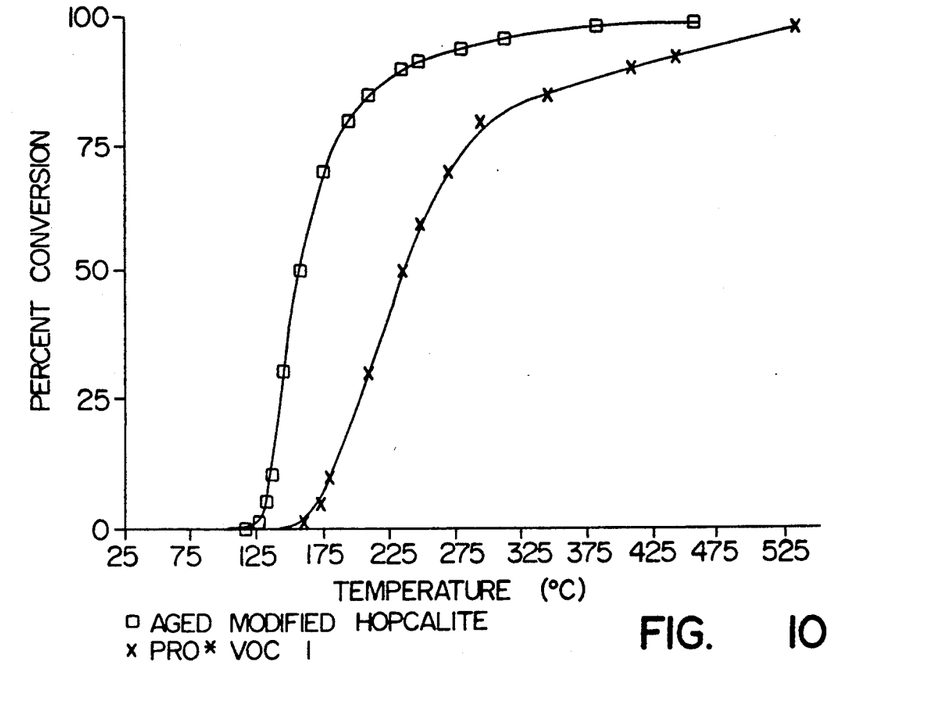
FIG. 10 is a graph showing conversion rate of propane versus temperature of heat aged, surface modified hopcalite containing lithium and the conversion rate for a conventional aged platinum/palladium catalyst, which is marketed by the Prototech Company under the name PRO*VOC 1.
Figure 11:
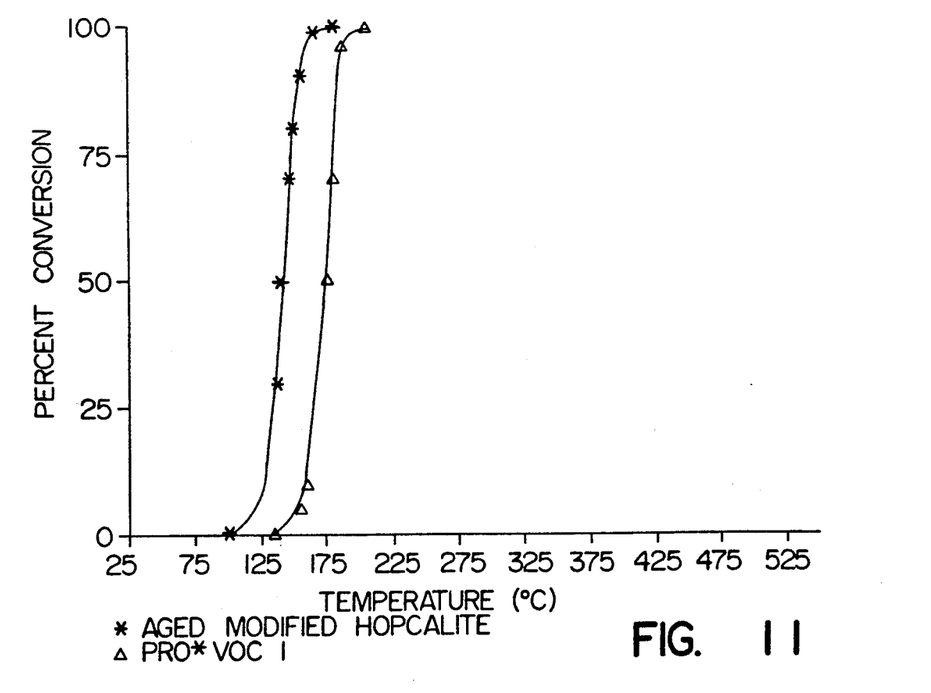
FIG. 11 is a graph showing conversion rate of carbon monoxide versus temperature of heat aged, surface modified hopcalite containing lithium and the conversion rate for aged PRO*VOC 1.

FIGS. 10 and 11 compare the catalytic effectiveness of an aged hopcalite against a conventional noble metal catalyst (PRO*VOC1) on propane (FIG. 10) and carbon monoxide (FIG. 11). The hopcalite was irradiated with lithium and aged 18 hours at 600° C. The PRO*VOC1 was also aged, at a slightly higher temperature (800° C.). As shown, the surface modified hopcalite outperformed the noble metal catalyst. The noble metal catalyst has a higher temperature capability than the hopcalite. However, for applications below the maximum temperature capability of the hopcalite, the surface modified hopcalite has been shown to be an effective replacement for noble metals for eliminating hydrocarbons such as carbon monoxide, propane and acetone.

The surface-modified catalyst may be used in applications where conventional hopcalite would be impractical. For example, surface-modified hopcalite may be ground into a powder and applied as a wash coat to various filter materials including woven and non-woven polyesters, ceramics, and metals. As noted before, conventional hopcalite cannot be used in wash coat formulations without losing its effectiveness.

A surface modified catalyst according to the invention may be utilized in granular form as a room temperature catalyst for certain hydrocarbons, such as carbon monoxide, and also to convert ozone to oxygen. Anther application of an improved catalyst according to the invention is to apply the catalyst as a coating to various carriers, such as woven or non-woven filter, ceramic honeycombs and the like. Such coated catalysts may be used to effect molecular catalytic cracking of hydrocarbons at room temperature. Examples for preparing coated filter carriers are described below.

Catalyst Chemical Composition

In a preferred embodiment, catalytic impregnation of a polyester, non-woven fibrous filter carrier is effected using a modified hopcalite Type 21215 material in a low temperature wash coat application. The hopcalite may be combined with other compounds, such as the catalyst zeolite (cobalt oxide). The hopcalite is surface-modified as described above, through an electrochemical plasma activation process. The fractions of the metal oxides in this outer coating layer are approximately as follows: manganese dioxide (0.75); copper (II) oxide (0.15); and cobalt (II & III) oxide (0.10). The outer coating layer is applied in an amount such that the outer coating layer constitutes approximately 30% by weight of the total weight of the catalyst and support medium (e.g., non-woven fiber).

Catalyst Wash Coat Formulation

There are a number of formulations and processes that may be used to provide sufficient catalytic support requirements. The preferred approach is to first coat the polyester non-woven substrate with an alumina wash coat in an aqueous salt solution. Then, using a slurry of finely ground hopcalite (5-20 microns), mixed with the cobalt (II & III) oxide, and an appropriate binder, a thick layer is deposited on the media. After the wash coat is applied to the substrate, the catalytic coated substrate is dipped in a dilute solution of ethyl alcohol and water containing 5% by weight chloroplantic acid. The substrate is then removed and dried in air at 150-200 degrees Fahrenheit, and then heated in a 300-350 degrees Fahrenheit oven for at least 5-7 minutes. Preferably, the carrier temperature should not exceed 300 degrees Fahrenheit. The process of depositing the modified hopcalite is repeated until a level of 30% by weight of wash coat has been reach. It should be noted that the copper manganese, or hopcalite, wash coating deposition process can be substituted by either a spraying operation or a dip-coating operation.

More particularly, in the preferred approach, hopcalite catalyst type 21215, available from Callery Chemical Company in Callery, Pa., is ground in water to a powder form having solder-mean diameter of between 2 and 4 microns and irradiated. A typical slurry composition using the catalytic powder is listed below.

| | |
|---|---|
| Catalyst 21215 powder | 100 parts by weight |
| Kelzan | 0.2 parts by weight |
| Binder | 6 parts by weight |
| Cobalt II and nitrate hexahydrate | 10 parts by weight |
| Deionized water | 55 parts by weight |
| or acetic acid | 75 parts by weight |

The binders can be selected from, but not limited to, a silicon resin solvent, a monobasic phosphate or a colloidal silica material. The preferred binder is one that requires a processing temperature of less than 300 degrees Fahrenheit.

The slurry is deposited onto the non-woven material by dipping and air drying at 100-120 degrees Fahrenheit, until a 30% by weight of the 21215 catalyst coat is achieved (i.e., the coating constitutes 30% of the total weight of the catalyst and non-woven material substrate). Other slurry compositions can be substituted, providing an adherent 30% by weight of the catalyst coating to be deposited. In addition, a 4% by weight of the cobalt II & III oxide is applied as part of the coating. This can be provided as a solution, as listed in the table above, or it can be added to the slurry in a powder form.

Once coated, the non-woven media is cured in a gas-fired or other-heated oven. It may be necessary to fire the coating after each dipping operation to ensure the coating does not spall.

In an alternative approach, the non-woven material is soaked in a salt solution containing the respective metals, and then fired to convert the deposited salts to the corresponding oxides. Prior to soaking the non-woven substrate in the metal salt solution referred to above, the pieces are soaked in a saturated solution of ammonia and water for approximately 5-15 minutes, then damp dried in air at room temperature. Following pre-treatment of the non-woven carriers, the non-woven carriers are soaked for at least a 5 minute period in the salt solution, then air dried at 100-120 degrees Fahrenheit. When the soaking and the drying are completed, the non-woven media is heated to approximately 280-300 degrees Fahrenheit in a reducing atmosphere until all the salts have decomposed. A change in weight does not occur.

A preferred solution for soaking the substrate is as follows: deionized water or acetic acid, 100 parts by weight; manganese II and nitrate x hydrate, 50 parts by weight; copper II nitrate trihydrate, 50 parts by weight; and zinc nitrate hexahydrate, 30 parts by weight.

Another method by which the catalytic material can be applied onto the non-woven media is by first spraying a tackifier coat of a variety of adhesives onto the non-woven media, and then applying the catalytic material in a granular, or pelletized, form.

The same formulations may be utilized to apply hopcalite alone to a filter or to apply hopcalite containing lithium and yttrium (with or without zeolite) to a filter.

The amount of catalyst and the type of binder used for an application depends upon several factors. How these are selected can be described generally with reference to the catalytic mechanisms that occur in the reaction process.

The behavior of a gas-phase heterogeneous catalyst in an operating environment is influenced by three transport phenomena, which will be described with reference to a catalyst bed model. As the gas, or contaminant passes through the interstices of the catalyst granulated bed, the gas flows around the exterior of the catalyst pellet. If a reaction ensues, a concentration gradient, and possibly a temperature gradient, will develop between the inlet and outlet of the control device, or filter media substrate. This is called axial gradient.

Also, concentrations in temperature gradients can arise between the center of the substrate and the walls of the substrate, which is known as a radial gradient. These gradients will, in turn, generate inductive and diffusive heat and mass transfer phenomena, referred to as inter-reactor transport.

Because the flow rate at the surface of the catalyst pellet is zero, a thin stagnant film will surround the pellet or granule. The chemical reaction takes place within the pellet. There will be a concentration, and possibly a temperature gradient, between the pellet and the flowing gas. The gradient crosses the boundary layer between the pellet and the gas bulk. Heat and mass transfer across this boundary layer is called interphase transport.

In addition, if a chemical reaction occurs, heat and mass transfer will take place inside the porous pellet. This is known as intra-pellet transport.

The following description of these phenomena begin with the interior of the catalyst and range outward.

Intra-pellet regime

Mass transport resistance inside a porous catalyst reduces the overall reaction rate with respect to the intrinsic rate. Intra-pellet heat transport resistance increases the overall rate of exothermic reactions and increases the rate of endothermic reactions. However, the physical characteristics of the catalyst are such that, in actual service, the intra-pellet concentration gradient is far more influential than the intra-pellet temperature gradient.

Pore Diffusion

Porous catalysts can provide up to hundreds of square meters of reactive surface per gram of pellet. Reactants diffuse through the pores to the active surface and reactions occur. Products then diffuse out through the pores to the surface of the pellet. Generally, the minute, irregularly shaped pores branch and connect in a fairly random manner. Because pore geometry is not well understood or classified, its characterization remains partly empirical.

If the mean free path of the diffusing molecule is much smaller than the pore diameter, i.e., the molecules collide with each other more frequently than with the pore walls, the diffusive transport mode is called Fick's diffusion.

For binary gas mixtures inside relatively large pores, the molar flux of binary gas mixture in pores of a catalyst ($J_i$, the rate of diffusion in the direction "z") is proportional to the concentration gradient in the direction of diffusion. The proportional concentration gradient is:

$$J_i = -D_{ij}(dC_i/dz)$$

where $D_{ij}$ is Fick's Binary Diffusion Coefficient of component "i" and component "j"; $C_i$ is the concentration of component i at the catalyst surface (g-moles/cm$^3$), and z is distance in the direction of diffusion. Fick's Binary Diffusion Coefficient, in cm$^2$/second, is correlated at:

$$D_{ij} = \frac{0.001858\ 3/2[(M_i + M_j)/M_iM_j]^{1/2}}{P\sigma_{ij}^2 \Omega D}$$

where $M_i$ and $M_j$ are the molecular weights of components i (manganese) and j (copper), respectively, the constant 0.001858 is a diffusive constant based upon temperature, P is total pressure in atmospheres, $\sigma_{ij}^2$ is the square of the constant force applied to the catalyst surface, and $\Omega_D$ is the integral rate of collision of the gas molecules in contact with the catalyst surface.

If the mean free path of the diffusing molecules is greater than pore diameter, i.e. relatively low gas density, small pore size causes the molecules to bump into the pore walls more frequently than into each other. The transport is known as Knudsen's Diffusion. The diffusing molecules are adsorbed and desorbed in a random direction, i.e. the molecules do not bounce off the walls like billiard balls, but momentarily stick to the walls before being released. Knudsen's Diffusion has been correlated in the following equation:

$$D_x = 19{,}400[9E_p2/(TMsP_p)(T/M)]$$

here $E_p$ is activation energy; $P_p$ is pressure. Pore diameters and gas concentrations that fall between those of Fick's diffusion and Knudsen's Diffusion, i.e. a transition region, may exist because the inverse of the diffusion constant is analogous to the resistance to the diffusion. The two modes of the diffusion can be combined in the transition region to an effective diffusivity ($D_{eff}$) for a component.

$$1/D_{eff,i} = 1/D_k + 1/D_{m,i}$$

where $D_{eff,i}$ is the effective diffusivity of component i in a multi-component mixture (cm$^2$/s); $D_k$ is the Knudsen diffusion coefficient; and $D_{m,i}$ is the diffusivity of component i in a multicomponent mixture.

Temperature Gradient

Intra-pellet heat conduction will be slow compared to the rate of heat generated by the reaction (exothermic) and can create a temperature gradient in a catalyst pellet. The gradient, if significant, can affect reaction rate via the following development:

Magnitude of this internal temperature gradient is examined using the fast, highly exothermic SO$_2$ oxidation reaction as an example (example only). The maximum temperature gradient possible within the pellet has been estimated as follows:

$$T_M = T_S + (-\Delta H D_{eff,i}/k_s)C_i$$

where $T_M$ is the maximum catalyst temperature; $T_s$ is the catalyst surface temperature; $\Delta H$ is the heat of reaction; $D_{eff,i}$ is the effective diffusivity of component i in a multicomponent mixture; $k_s$ is the thermal conductivity of the catalyst pellet; and $C_i$ is the concentration gradient of component i at the catalyst surface.

Boundary conditions pertinent to the intra-pellet mass and heat transfer are:

$$k_g(C_i - C^*_i) = D_{eff,i}(dC_i/dz)_{z=p} \approx D_{eff,i}C^*_i d_p$$

$$h_g(T_b - T_s) = k_s(dT/dz)_{z=dp} = k_s(T_s - T_M)/d_p$$

where $k_g$ is the gas mass-transfer coefficient; $C_i$ is the concentration of component i at the catalyst surface; $C^*_i$ is the concentration of component i at the catalyst surface; $h_g$ is the gas heat transfer coefficient; $T_b$ is the bulk gas temperature; $T_s$ is the catalyst surface temperature; and $k_s$ is the thermal conductivity of the catalyst pellet.

The calculation of Fick's coefficient, the proportional concentration gradient (Knudsen's Diffusion), and the temperature gradient, will indicate the expected dwell time and capture rate. Depending upon the particular rate of air flow and concentration of contaminant gases to be neutralized, the amount of desired surface area of catalyst can be determined.

First the mass transport resistance is determined for surface modified hopcalite, as well as hopcalite in which lithium has been added. This can be accomplished using Fick's diffusion equation ($J_{ij}$). After yttrium has been added, the total thermal conductivity (Knudsen's diffusion) of the catalyst mix can be determined using Knudsen's diffusion equation. Then, the catalyst volume ($V_{bed}$) can be determined using the following equation:

$$V_{bed} = 60 Q_{COM}/SV$$

where $Q_{COM}$ is the flow rate of the gas stream (standard cubic feet per minute (SCFM)) and SV is the space velocity of the gas as it travels through the catalyst carrier (which is a function of the open area of the catalyst bed, $J_{ij}$ and Knudsen's diffusion).

For example, in a typical system calculation of the mass transport resistance and thermal conductivity may indicate a desirable maximum space velocity of 10,000 cubic feet/hour, in order to allow sufficient (minimum) dwell time for optimum conversion. If the design flow rate of the gas is 2500 CFM, then the catalyst area would equal 15 cubic feet. If a smaller amount of catalyst were to be used, for example, 5 cubic feet, the velocity over the catalyst surface would increase to 30,000 CFH and the removal efficiency would decrease typically from about 99% to less than 90%.

The dwell time and capture rate are increased by the addition of lithium, in the form of lithium nitrate or lithium hydroxide, which will affect the mass transport resistance of the catalyst surface. It has been found that lithium reacts with carbon dioxide and water and heats the catalyst. This has the effect of heating the catalyst toward the light off temperature, which will increase the catalytic action, and also keeping the copper-manganese active sites dry.

Similarly, the capture rate may be slowed down by the addition of yttrium, which affects the pore diffusion, to the wash coating formulation.

More particularly, the addition of lithium to the catalyst enhances and improves the mass transfer resistance and thus the binary diffusion coefficient of the catalyst material (which can be calculated by Fick's equation). This is due to the fact that lithium gives off a high exotherm when in contact with carbon dioxide and water vapors. This exotherm serves to surface heat the catalyst heat mass transfer. When an emission component such as acetone is catalytically oxidized, the by products are $CO_2$ and $H_2O$ which, in turn, contact the lithium and generate additional exothermic heat.

The exothermic reaction of lithium tends to increase temperature at the reaction sites. The addition of yttrium, which turns into a superconductor at elevated temperatures, acts to thermally stabilize the carrier and prevent excess build up of heat, which could otherwise cause thermal decomposition of the catalyst. The yttrium thus acts as a thermal limit switch to maintain the exothermic reaction and at the same time not allow a thermal runaway condition to develop which would decompose the catalyst. The result is a very low temperature oxidation reaction and a very effective low temperature catalyst.

In a preferred embodiment, lithium in an amount of 15% by weight of the modified hopcalite is employed, and added to the hopcalite prior to irradiation. The amount of lithium may adjusted dependent upon the calculated values of Fick's coefficient and the proportional concentration gradient, Knudsen's Diffusion, and the temperature gradient Yttrium in a ratio of 3% by weight of the modified hopcalite and lithium is preferably used and adjusted as desired.

The foregoing represents a description of the preferred embodiments of the invention. Variations and modifications of the foregoing may be employed without departing from the inventive concepts disclosed herein. All such modifications and variations are intended to be within the scope of the invention as defined in the following claims.

I claim:

1. A method of making a surface-modified catalyst comprising the steps of:
    providing a catalyst compound composed of at least two mechanically mixed elements of the type forming active catalyst sites at the boundaries of such elements, wherein said catalyst compound comprises hopcalite; and
    irradiating said compound at an energy level sufficient to cause molecular dispersion of at least one of the elements and increase the number of active sites.

2. A method according to claim 1, comprising the step of adding lithium prior to irradiation.

3. A method according to claim 2, wherein lithium is added prior to irradiation in an amount of about 15% by weight.

4. A method according to claim 2, comprising the step of adding yttrium after irradiation.

5. A method according to claim 3, comprising the step of adding yttrium after irradiation.

6. A method according to claim 5, wherein yttrium is added prior to irradiation in an amount of about 3% by weight.

7. A surface-modified catalyst made according to the method of claim 1, 2, 3, 4, 5, or 6.

* * * * *